(12) United States Patent
Egashira et al.

(10) Patent No.: US 7,548,265 B2
(45) Date of Patent: Jun. 16, 2009

(54) IMAGE PICKUP APPARATUS AND IMAGE PICKUP METHOD INCLUDING CLOCKS

(75) Inventors: Yoshihiro Egashira, Ome (JP); Masayoshi Sato, Ome (JP); Hiroyuki Ishino, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 634 days.

(21) Appl. No.: 11/251,913

(22) Filed: Oct. 18, 2005

(65) Prior Publication Data

US 2006/0087575 A1    Apr. 27, 2006

(30) Foreign Application Priority Data

Oct. 18, 2004    (JP) .............................. 2004-303256

(51) Int. Cl.
*H04N 3/14*    (2006.01)
*H04N 5/335*    (2006.01)
*H04N 7/01*    (2006.01)
*H04N 11/20*    (2006.01)

(52) U.S. Cl. .................. 348/312; 348/443; 348/296

(58) Field of Classification Search ............... 348/443, 348/222.1, 220.1, 296, 312
See application file for complete search history.

(56) References Cited

U.S. PATENT DOCUMENTS

| 5,321,315 | A | * | 6/1994 | Kannegundla | 327/175 |
| 5,440,342 | A | * | 8/1995 | Kannegundla | 348/294 |
| 5,640,202 | A | * | 6/1997 | Kondo et al. | 348/222.1 |
| 6,614,477 | B1 | * | 9/2003 | Lee et al. | 348/312 |
| 6,891,570 | B2 | * | 5/2005 | Tantalo et al. | 348/362 |
| 7,015,965 | B2 | * | 3/2006 | Asada et al. | 348/312 |
| 7,283,169 | B2 | * | 10/2007 | Tanaka | 348/312 |
| 7,336,310 | B2 | * | 2/2008 | Sakakibara | 348/302 |
| 7,406,253 | B2 | * | 7/2008 | Ueda et al. | 386/107 |
| 2004/0212690 | A1 | * | 10/2004 | Nakase et al. | 348/222.1 |
| 2007/0070212 | A1 | * | 3/2007 | Haneda | 348/222.1 |

FOREIGN PATENT DOCUMENTS

| JP | 56032881 A | * | 4/1981 |
| JP | 04223776 A | * | 8/1992 |
| JP | 08-214219 | | 8/1996 |
| JP | 08-223444 | | 8/1996 |
| JP | 11041529 | * | 2/1999 |
| JP | 11-284896 | | 10/1999 |

(Continued)

*Primary Examiner*—John M Villecco
(74) *Attorney, Agent, or Firm*—Finnegan, Henderson, Farabow, Garrett & Dunner, L.L.P.

(57) ABSTRACT

An image pickup apparatus has a solid-state image pickup device which outputs a charge signal according to a timing signal, a sampling unit which samples the charge signal in response to the timing signal, an A/D converting unit which converts a sample signal to a digital signal in response to the timing signal, and a timing unit which, in response to the number of first clocks in a horizontal period of the timing signal when a picture signal is outputted at a first frame rate (60 fps), generates a timing signal having the number of clocks in the horizontal period higher than the number of the first clocks, and supplies a timing signal based on the generated timing signal, the sampling unit, and the A/D converting unit in case of a second frame rate (50 fps) lower than first frame rate.

10 Claims, 5 Drawing Sheets

| Frame rate | CCD drive frequency | Number of horizontal period clocks | Number of vertical period lines |
|---|---|---|---|
| A | 60fps | 33.53639MHz | 1411ck | 396 lines |
| C | 50fps | 33.53639MHz | 1694ck | 396 lines |

Formula 1: Frame rate = 1 / ((1 / CCD drive frequency) × number of horizontal period clocks × number of vertical period lines)

FOREIGN PATENT DOCUMENTS

| | | |
|---|---|---|
| JP | 11-331868 | 11/1999 |
| JP | 2000-23007 | 1/2000 |
| JP | 2000032441 A * | 1/2000 |
| JP | 2000-69376 | 3/2000 |
| JP | 2003-101890 | 4/2003 |
| JP | 2005278060 A * | 10/2005 |
| TW | 527816 A * | 4/2003 |
| WO | WO 9220187 A1 * | 11/1992 |

* cited by examiner

| | Frame rate | CCD drive frequency | Number of horizontal period clocks | Number of vertical period lines |
|---|---|---|---|---|
| A | 60fps(NTSC) | 33.53639MHz | 1411ck | 396 lines |
| B | 50fps(PAL) | 27.9378MHz | 1411ck | 396 lines |

Formula 1: Frame rate = 1 / ((1 / CCD drive frequency) × number of horizontal period clocks × number of vertical period lines)

|   | Frame rate | CCD drive frequency | Number of horizontal period clocks | Number of vertical period lines |
|---|---|---|---|---|
| A | 60fps | 33.53639MHz | 1411ck | 396 lines |
| C | 50fps | 33.53639MHz | 1694ck | 396 lines |

Formula 1: Frame rate = 1 / ((1 / CCD drive frequency) × number of horizontal period clocks × number of vertical period lines)

| | Frame rate | CCD drive frequency | Number of horizontal period clocks | Number of vertical period lines |
|---|---|---|---|---|
| D | 50fps | 27.9378MHz | 1411ck | 396 lines |
| E | 60fps | 27.9378MHz | 1176ck | 396 lines |

Formula 1: Frame rate = 1 / ((1 / CCD drive frequency) × number of horizontal period clocks × number of vertical period lines)

IMAGE PICKUP APPARATUS AND IMAGE PICKUP METHOD INCLUDING CLOCKS

CROSS-REFERENCE TO RELATED APPLICATIONS

This application is based upon and claims the benefit of priority from prior Japanese Patent Application No. 2004-303256, filed Oct. 18, 2004, the entire contents of which are incorporated herein by reference.

BACKGROUND OF THE INVENTION

1. Field of the Invention

The present invention relates to an image pickup apparatus which uses a solid-state image pickup device such as a charge coupled device (CCD), and more particularly, to an image pickup apparatus and an image pickup method for converting a frame rate.

2. Description of the Related Art

Conventionally, an image pickup apparatus for receiving picture light and outputting a frame rate in response to the receipt of the light has been well known as that which uses a solid-state image pickup device such as, for example, a CCD. In such an image pickup apparatus, it becomes possible to output a picture signal at plural types of resolutions.

Patent document 1 (Jpn. Pat. Appln. KOKAI Publication No. 2000-23007) discloses a CCD image pickup apparatus for switching a picture signal in accordance with a plurality of resolutions, wherein a user can select a picture signal according to an arbitrary resolution as required.

However, in the prior art of Patent document 1, it is impossible to known what to do when an attempt is made to change a frame rate of the image pickup apparatus. That is, in general, in the CCD image pickup apparatus, a frame rate of 50 fps or a frame rate of 60 fps is known. However, there is a problem that an image pickup apparatus designed for use in the frame rate of 60 fps cannot be easily changed so as to obtain a picture output at the frame rate of 50 fps.

BRIEF SUMMARY OF THE INVENTION

An embodiment of the present invention is an image pickup apparatus comprising: a solid-state image pickup device which receives a picture light and outputs a charge signal according to the receipt of the light in response to a given timing signal; a sampling unit which samples the charge signal from the solid-state image pickup device in response to the given timing signal and outputs a sample signal according to a result of the sampling; an A/D converting unit which converts the sample signal from the sampling unit to a digital signal in response to the given timing signal; a digital processing unit which applies predetermined processing for the digital signal and outputs the processed signal; a D/A converting unit which outputs a picture signal obtained by converting to an analog signal the digital signal to which the predetermined processing has been applied; and a timing unit which, in response to the number of first clocks in a horizontal period of the timing signal supplied in the case where a picture signal of a first frame rate (60 fps) is obtained from the D/A converting unit, generates a timing signal having the number of clocks in the horizontal period than the number of the first clocks, and supplies a timing signal based on the generated timing signal to at least one of the solid-state image pickup device, the sampling unit, and the A/D converting unit in the case where a picture signal of a second frame rate (50 fps) which is lower than the first frame rate.

DETAILED DESCRIPTION OF THE INVENTION

Hereinafter, one embodiment of the present invention will be described in detail with reference to the accompanying drawings.

Figure 1:
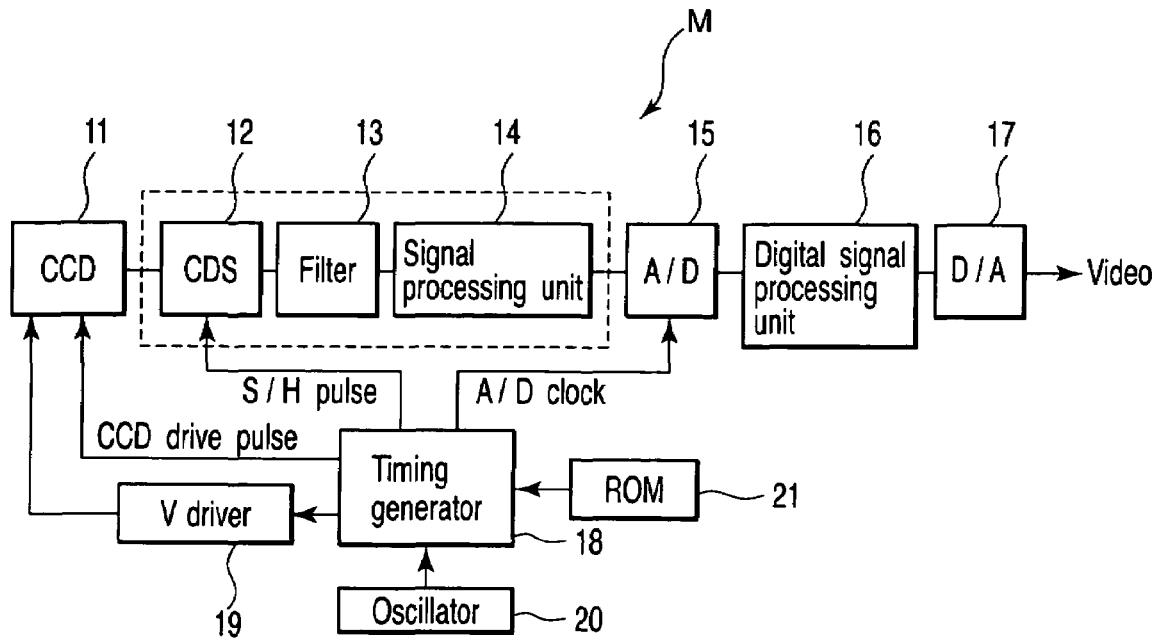
FIG. 1 is a block diagram depicting an example of a configuration of an image pickup apparatus according to one embodiment of the present invention.
Figure 2:
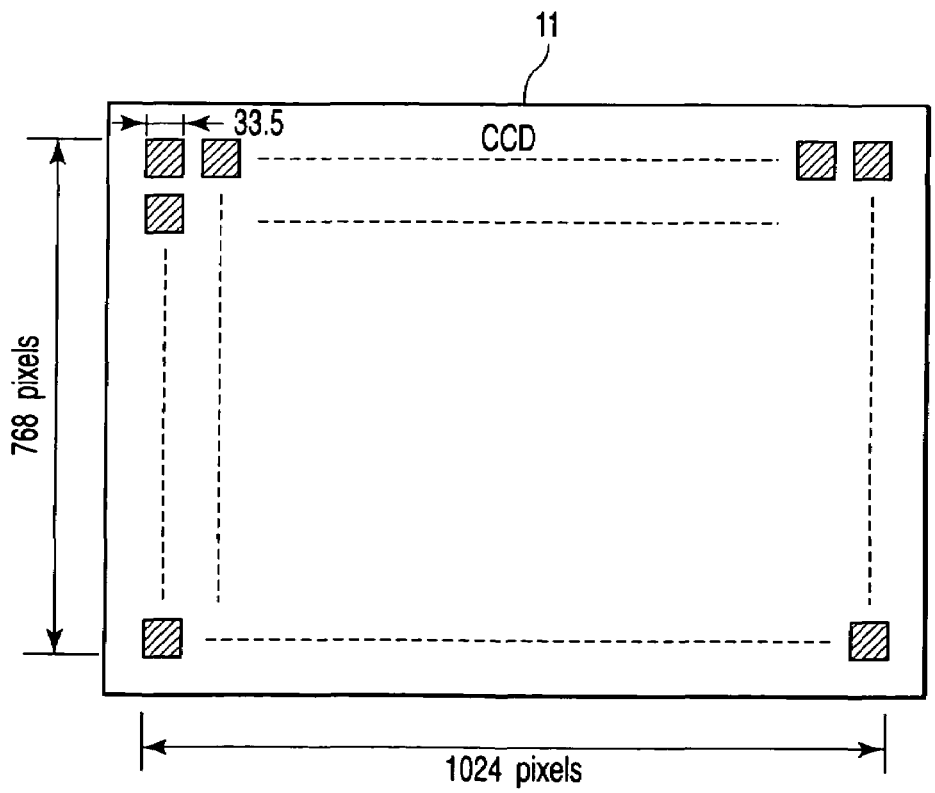
FIG. 2 is a plan view showing an example of a configuration of a CCD element in the image pickup apparatus according to the embodiment of the invention.
Figures 3, 4:
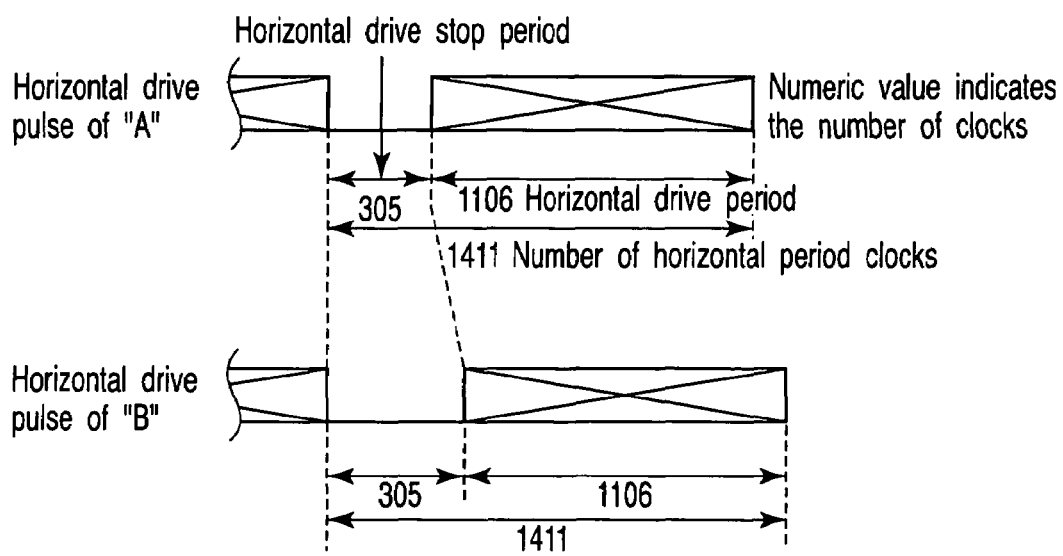
FIG. 3 is an illustrative view for explaining a case in which conversion from a frame rate of 60 fps to 50 fps has been made by decreasing a CCD drive frequency in the image pickup apparatus according to the embodiment of the invention.
FIG. 4 is a timing chart showing a case in which conversion from a frame rate of 60 fps to 50 fps has been made by decreasing a CCD drive frequency in the image pickup apparatus according to the embodiment of the invention.
Figure 5:
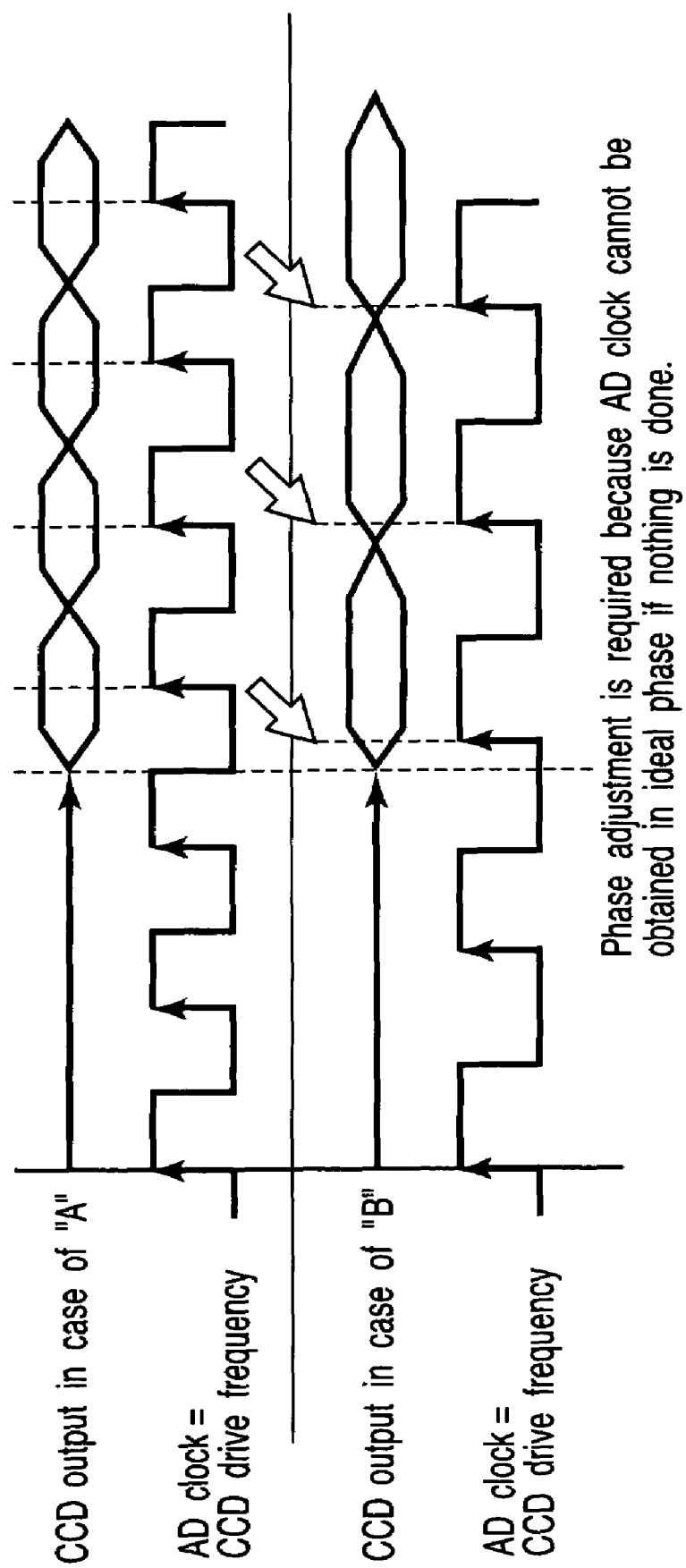
FIG. 5 is a timing chart showing a case in which conversion from a frame rate of 60 fps to 50 fps has been made by decreasing a CCD drive frequency in the image pickup apparatus according to the embodiment of the invention.
Figures 6, 7:
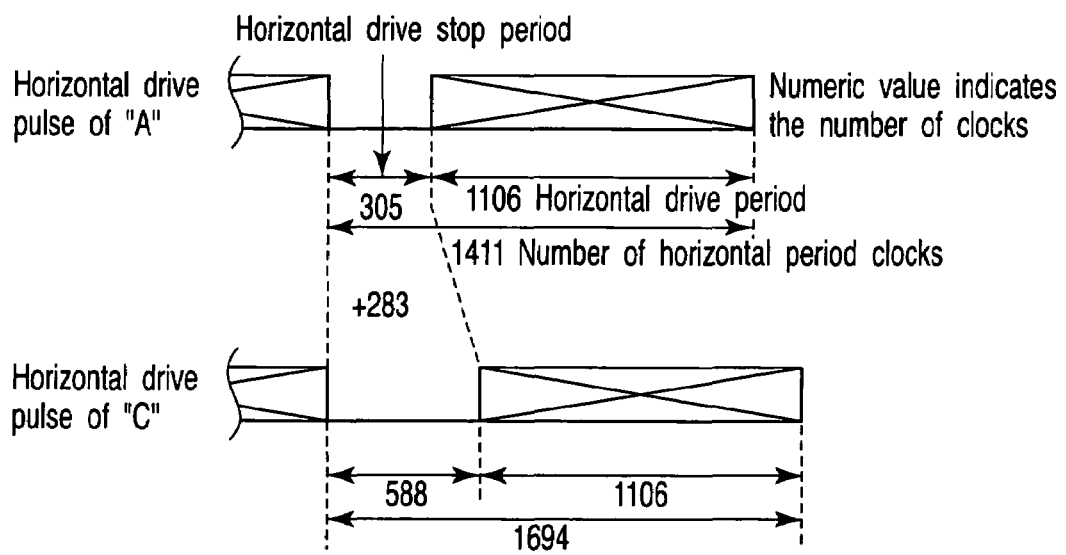
FIG. 6 is an illustrative view for explaining a case in which conversion from a frame rate of 60 fps to 50 fps has been made by increasing the number of horizontal period clocks in the image pickup apparatus according to the embodiment of the invention.
FIG. 7 is a timing chart showing a case in which conversion from a frame rate of 60 fps to 50 fps has been made by increasing the number of horizontal period clocks in the image pickup apparatus according to the embodiment of the invention.
Figures 8, 9:
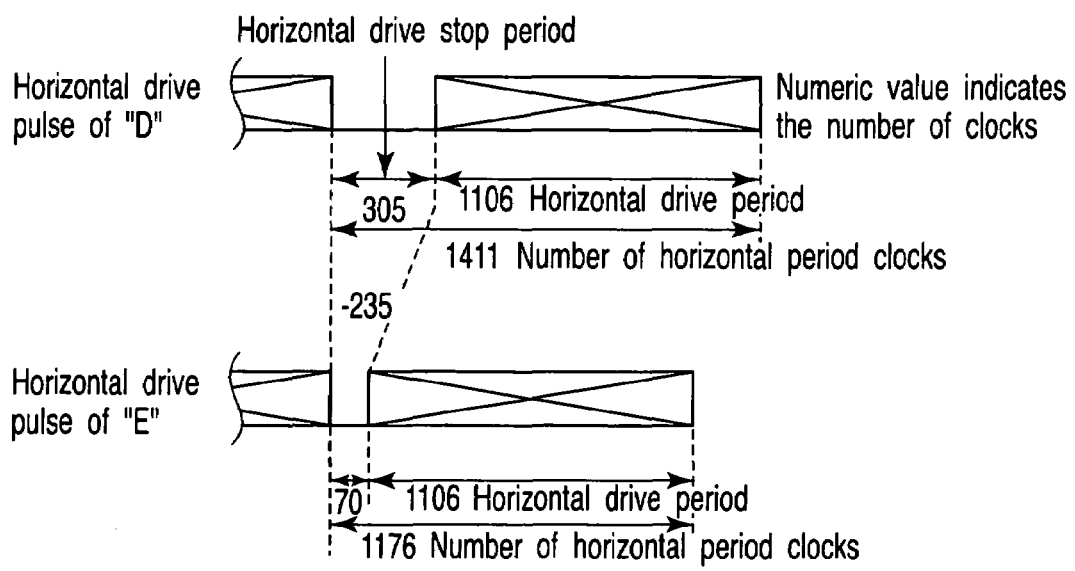
FIG. 8 is an illustrative view for explaining a case in which conversion from a frame rate of 60 fps to 50 fps has been made by decreasing the number of horizontal period clocks in the image pickup apparatus according to the embodiment of the invention.
FIG. 9 is a timing chart showing a case in which conversion from a frame rate of 60 fps to 50 fps has been made by decreasing the number of horizontal period clocks in the image pickup apparatus according to the embodiment of the invention.

An image pickup apparatus according to the invention is an image pickup apparatus using a solid state image pickup device such as a CCD. FIG. 1 is a block diagram depicting an example of a configuration of an image pickup apparatus according to one embodiment of the invention; FIG. 2 is a plan view showing an example of a configuration of a CCD element in the image pickup apparatus; FIG. 3 is an illustrative view for explaining a case in which conversion from a frame rate of 60 fps to 50 fps has been made by decreasing a CCD drive frequency in the image pickup apparatus;. FIG. 4 is a timing chart showing a case in which conversion from a frame rate of 60 fps to 50 fps has been made by decreasing a CCD drive frequency in the image pickup apparatus; FIG. 5 is a timing chart showing a case in which conversion from a frame rate of 60 fps to 50 fps has been made by decreasing a CCD drive frequency in the image pickup apparatus; FIG. 6 is an illustrative view for explaining a case in which conversion from a frame rate of 60 fps to 50 fps has been made by increasing the number of horizontal period clocks in the image pickup apparatus; FIG. 7 is a timing chart showing a case in which conversion from a frame rate of 60 fps to 50 fps has been made by increasing the number of horizontal period clocks in the image pickup apparatus; FIG. 8 is an illustrative view for explaining a case in which conversion from a frame rate of 60 fps to 50 fps has been made by decreasing the number of horizontal period clocks in the image pickup apparatus; and FIG. 9 is a timing chart showing a case in which conversion from a frame rate of 60 fps to 50 fps has been made by decreasing the number of horizontal period clocks in the image pickup apparatus.

<Configuration of Image Pickup Apparatus According to the Present Invention>

An image pickup apparatus M according to the invention, as shown in FIG. 1, has a CCD 11 which is a solid-state image pickup device; a correlate double sample (CDS) circuit 12 which is an analog circuit for receiving a charge signal being an output from the CCD; a filter 13 for filtering the output at a high frequency; a signal processing unit 14 for carrying out color correction and gamma correction in response to the filter output; an A/D converter 15 for A/D converting the output; a digital signal processing unit 16 for carrying out, for example, G-channel pixel correction processing, scaling processing, IP conversion and the like with respect to the converted digital signal; and a D/A converter 17 for D/A converting the output.

Here, the CCD 11, the CDS circuit 12, the filter 13, the signal processing unit 14, the A/D converter 15, the digital signal processing unit 16, the D/A converter 17 and the like, of the image pickup apparatus M are configured so that three sequences are in parallel to each other for each of an R channel, a G channel, and a B channel, if the image pickup apparatus M outputs an image signal of each of the RGB.

On the other hand, the image pickup apparatus M, unlike these constituent elements, has: an oscillator 20 using crystal oscillation or the like; a timing generator for receiving an oscillating clock from the oscillator and supplying a desired timing signal to the CCD 11, the CDS 12, the A/D converter 15 and the like; a ROM 21 for supplying a program and a set value to the timing generator 18; and a V driver 19 for receiving a desired timing signal from the timing generator 18 and supplying a vertical drive pulse to the CCD 11.

In addition, in the CCD element 11 which is a solid-state image pickup device, as shown in FIG. 2 as one example, elements in vertical 768 lines and horizontal 1024 columns are provided to be arranged on a substrate of about 1 cm$^2$ in square. Three CCD elements 11 are provided if the RGB signal specification is followed.

In the above-described configuration, the image pickup apparatus M according to the invention outputs a picture signal as follows. That is, from the CCD element 11 configured for each of the R channel, G channel, and B channel, as an example, a charge signal of about 500 mV is outputted to the CDS circuit 12 as an example.

At this time, on the basis of a value assigned from the ROM 21 or the like under a clock from the crystal signal generator 20 as an operating timing, a timing signal serving as a CCD drive pulse (vertical drive pulse) is supplied from the timing generator 18 to the CCD element 11, providing an output timing of each pixel on the CCD element 11. At the same time, a timing signal is supplied from the timing generator 18 to the V driver 19. From the V driver 19, the CD drive pulse of 1024 elements for one line is supplied to the CCD element 11, followed by a vertical drive pulse which is a timing of moving to a next line. In accordance with these two timing signals, a detecting signal for each frame is supplied to the CDS circuit 12.

Here, as an example, in the case of the image pickup apparatus M having a frame rate of 60 fps, a CCD drive frequency of the CCD drive pulse is 33.53639 MHz, the number of horizontal period clocks is 1411 ck, and the number of vertical period lines is 396 lines.

Next, the CDS circuit 12 samples a charge signal assigned from the CCD element 11 in response to a sampling hold pulse which is a timing signal from the timing generator 18. The sampled charge signal is supplied to the signal processing unit 14 after a high frequency noise has been eliminated by the filter 13. In the signal processing unit 14, for example, color correction processing and gamma correction processing are applied for an image signal whose high frequency noise has been eliminated.

Further, an output from the signal processing unit 14 is A/D converted in response to an A/D clock signal which is a timing signal from the timing generator 18, and a digital signal is supplied to the digital signal processing unit 16. In the digital signal processing unit 16, scaling processing, IP conversion and the like are carried out with respect to the digital signal.

The scaling processing used here denotes that the G channel is set to be shifted by a half pixel with respect to the R channel and B channel in the previously described CCD element 11 in order to a nominal resolution, and then, processing is carried out in order to recover the shifting in the digital signal processing unit 16 or the like, thereby obtaining a signal for 2048 pixels. The IP conversion used here denotes processing for changing an interlace image signal to a progressive image signal in order.

Thereafter, this digital image signal is D/A converted in the D/A converter 17, and the converted signal is outputted as an analog color image signal such as a composite video output signal.

<Changing Frame Rate>

(Frame Rate Change by Changing CCD Drive Frequency)

In general, in an image pickup apparatus utilizing a CCD element or the like, a frame rate of 60 fps (frame per second) or 50 fps is often taken. Here, for example, in the image pickup apparatus M of case A as shown in FIG. 3, the CCD drive frequency is set to 33.53639 MHz, the number of horizontal period clocks is set to 1411 ck, and the number of vertical period lines is set to 396 lines in the case of the frame rate of 60, whereby the timing generator 18 is set and the circuit constants of the CDS circuit 12, the A/D converter 15 and the like are determined.

When an attempt is made to use this frame rate of 60 fps by converting it to 50 fps, in general, there can be proposed a method for replacing the oscillator 20 with the replacement oscillator, changing a CCD drive frequency is changed to 27.9378 MHz, and changing a circuit constant of a peripheral circuit in response to the change, as shown in case B of FIGS. 3 and 4.

However, if this method is used, it becomes necessary to change parts of the oscillator 20, the filter 13 and the like. Further, as indicated by the arrow in case B in FIG. 5, a rise timing of an A/D clock and a timing of a CCD output do not coincide with each other at an optimal value (phase shifting). That is, the rise timing of the A/D clock is required to coincide with each center of the CCD output as in the case A, in order to detect a stable signal. However, in case B, the rise timing of the A/D clock is obtained as a timing deviating from each center of the CCD output. Thus, there is an inconvenience that the value of the CCD output is not precisely conveyed to the rear stage.

(Frame Rate Change by Changing the Number of Horizontal Period Clocks: 60 to 50)

Now, description will be given for a method for changing a frame rate by changing the number of horizontal period clocks, as shown in FIG. 6, in the timing generator 18. That is, when the frame rate of case C is 50 fps with respect to the frame rate of 60 fps in case A, the CCD drive frequency is maintained to be 33.53639 MHz without changing it, and the number of horizontal period clocks is changed to 1694 ck, thereby achieving frame rate change.

This is clear from formula 1 shown in FIG. 6. That is, the frame rate is a value defined by:

(Frame rate)=1/((CCD drive frequency)×(number of horizontal period clocks)×(number of vertical period lines)).

Here, the timing generator 18 is composed of PLD, and the contents of the ROM 21 of the PLD is rewritten, thereby making it possible to change a horizontal drive stop period. Thus, there is no need for a circuit change.

By using such a method, it becomes possible to convert a frame rate without changing a signal processing circuit such as an oscillator, an electric filter, and a high speed pulse (S/H pulse or A/D clock for CDS) phase.

(Frame Rate Change by Changing the Number of Horizontal Period Clocks: 50 to 60)

Further, it becomes possible to increase a frame rate by changing the number of horizontal period clocks. That is, as shown in the illustrative view of FIG. 8, it is possible to change a frame rate of 50 fps in case D to a frame rate of 60 fps in case E. In this case, it becomes possible to change the number of horizontal period clocks from 1411 ck to 1178 ck on the basis of formula 1 without changing the CCD drive frequency from 27.9378 MHz. At this time, as shown in FIG. 9, a horizontal drive stop period is changed from "305" to "70", and the changed period meets formula 1.

In this manner, in the image pickup apparatus M, it becomes possible to increase the frame rate of 50 to the frame rate of 60 merely by changing a constant or the like of the ROM 21 or the like, and there is no need for a work such as a change of the oscillator 20 or a change of the filter 13.

In addition, while the present embodiment has described a typical example of changing the frame rate 50 fps to 60 fps and vice versa, it is also possible to easily change a frame rate of one value to that of another value in a similar manner.

As has been described above in detail, in the above-described image pickup apparatus, a frame rate is changed by increasing the number of horizontal period clocks without changing the CCD drive frequency.

Consequently, for example, as compared with a case of changing the CCD drive frequency in order to change a frame rate, there is no need for a risk such as an oscillator frequency change or electric filter characteristic change and a phase change of a high speed pulse (S/H pulse or A/D clock for use in CDS) relevant to a total amount of circuit delay. Therefore, according to the present invention, there can be provided an image pickup apparatus using a solid-state image pickup device or the like capable of changing a frame rate by using a simplified method.

According to a variety of embodiments described above, although one skilled in the art can achieve the present invention, it is obvious for one skilled in the art to conceive a variety of modified examples of these embodiments. In addition, even if one skilled in the art does not have any inventive ability, it is possible to apply the present invention to a variety of embodiments. Therefore, the invention covers a broad scope without departing from the disclosed principle and novel features, and is not limited to the above-described embodiments.

What is claimed is:

1. An image pickup apparatus comprising:
a solid-state image pickup device which receives a picture light and outputs a charge signal according to the receipt of the light in response to a given timing signal;
a sampling unit which samples the charge signal from the solid-state image pickup device in response to the given timing signal and outputs a sample signal according to a result of the sampling;
an A/D converting unit which converts the sample signal from the sampling unit to a digital signal in response to the given timing signal;
a digital processing unit which applies predetermined processing for the digital signal and outputs the processed signal;
a D/A converting unit which outputs a picture signal obtained by converting to an analog signal the digital signal to which the predetermined processing has been applied; and
a timing unit which, in response to 1411 first clocks in a horizontal period of the timing signal supplied in the case where a picture signal of a first frame rate of 60 fps is obtained from the D/A converting unit, generates a timing signal having 1694 second clocks, and supplies a timing signal based on the generated timing signal to at least one of the solid-state image pickup device, the sampling unit, and the A/D converting unit in the case where a picture signal of a second frame rate of 50 fps.

2. An image pickup apparatus according to claim 1, further comprising an oscillating unit which supplies a timing signal having third clocks to the timing unit when the picture signal of the first frame rate is outputted as well as when the picture signal of the second frame rate is outputted.

3. An image pickup apparatus according to claim 1, wherein the solid-state image pickup device outputs a color picture signal by providing three types of solid-state image pickup devices for an R signal, a G signal, and a B signal, and processing a charge signal from each of the solid-state image pickup devices for each of the color signals.

4. An image pickup apparatus according to claim 3, wherein the solid-state image pickup device for the G signal is disposed at a position shifted by a half pixel with respect to the solid-state image pickup devices according to the R signal and B signal, recovers the shifting in the digital signal of the digital processing unit, and outputs the digital signal.

5. An image pickup method using an image pickup apparatus which comprises a solid-state image pickup device which receives a picture light and outputs a charge signal according to the received light in response to a given timing signal; a sampling unit which samples the charge signal from the solid-state image pickup device in response to the given timing signal and outputs a sample signal according to a result of the sampling; an A/D converting unit which converts the sample signal from the sampling unit to a digital signal in response to the given timing signal; and a digital processing unit which applies predetermined processing for the digital signal and outputs the processed signal, the method comprising:

in response to 1411 first clocks in a horizontal period of the timing signal supplied in the case where a picture signal of a first frame rate of 60 fps is obtained from the D/A converting unit, generating a timing signal having 1694 second clocks in the horizontal period and supplying a timing signal based on the generated timing signal to at least one of the solid-state image pickup device, the sampling unit, and the A/D converting unit in the case where a picture signal of a second frame rate of 50 fps.

6. An image pickup method according to claim 5, wherein a clock signal having the same number of clocks is supplied to the timing unit when the picture signal of the first frame rate is outputted as well as when the picture signal of the second frame rate is outputted.

7. An image pickup method according to claim 5, wherein the solid-state image pickup device outputs a color picture signal by providing three types of solid-state image pickup devices for an R signal, a G signal, and a B signal, and processing a charge signal from each of the solid-state image pickup devices for each of the color signals.

8. An image pickup method according to claim 7, wherein the solid-state image pickup device for the G signal is disposed at a position shifted by a half pixel with respect to the solid-state image pickup devices according to the R signal and B signal, recovers the shifting in the digital signal of the digital processing unit, and outputs the digital signal.

9. An image pickup apparatus comprising:
a solid-state image pickup device which receives a picture light and outputs a charge signal according to the receipt of the light in response to a given timing signal;
a sampling unit which samples the charge signal from the solid-state image pickup device in response to the given timing signal and outputs a sample signal according to a result of the sampling;
an A/D converting unit which converts the sample signal from the sampling unit to a digital signal in response to the given timing signal;
a digital processing unit which applies predetermined processing for the digital signal and outputs the processed signal;
a D/A converting unit which outputs a picture signal obtained by converting to an analog signal the digital signal to which the predetermined processing has been applied; and
a timing unit which, in response to 1411 first clocks in a horizontal period of the timing signal supplied in the case where a picture signal of a first frame rate of 50 fps is obtained from the D/A converting unit, generates a timing signal having 1178 second clocks, and supplies a timing signal based on the generated timing signal to at least one of the solid-state image pickup device, the sampling unit, and the A/D converting unit in the case where a picture signal of a second frame rate is 60 fps.

10. An image pickup method using an image pickup apparatus which comprises a solid-state image pickup device which receives a picture light and outputs a charge signal according to the received light in response to a given timing signal; a sampling unit which samples the charge signal from the solid-state image pickup device in response to the given timing signal and outputs a sample signal according to a result of the sampling; an A/D converting unit which converts the sample signal from the sampling unit to a digital signal in response to the given timing signal; and a digital processing unit which applies predetermined processing for the digital signal and outputs the processed signal, the method comprising:
in response to 1411 first clocks in a horizontal period of the timing signal supplied in the case where a picture signal of a first frame rate of 50 fps is obtained from the D/A converting unit, generating a timing signal having 1178 second clocks in the horizontal period and supplying a timing signal based on the generated timing signal to at least one of the solid-state image pickup device, the sampling unit, and the A/D converting unit in the case where a picture signal of a second frame rate is 60 fps.

* * * * *